No. 823,048. PATENTED JUNE 12, 1906.
J. P. KELLY.
AIR BRAKE.
APPLICATION FILED FEB. 12, 1904.
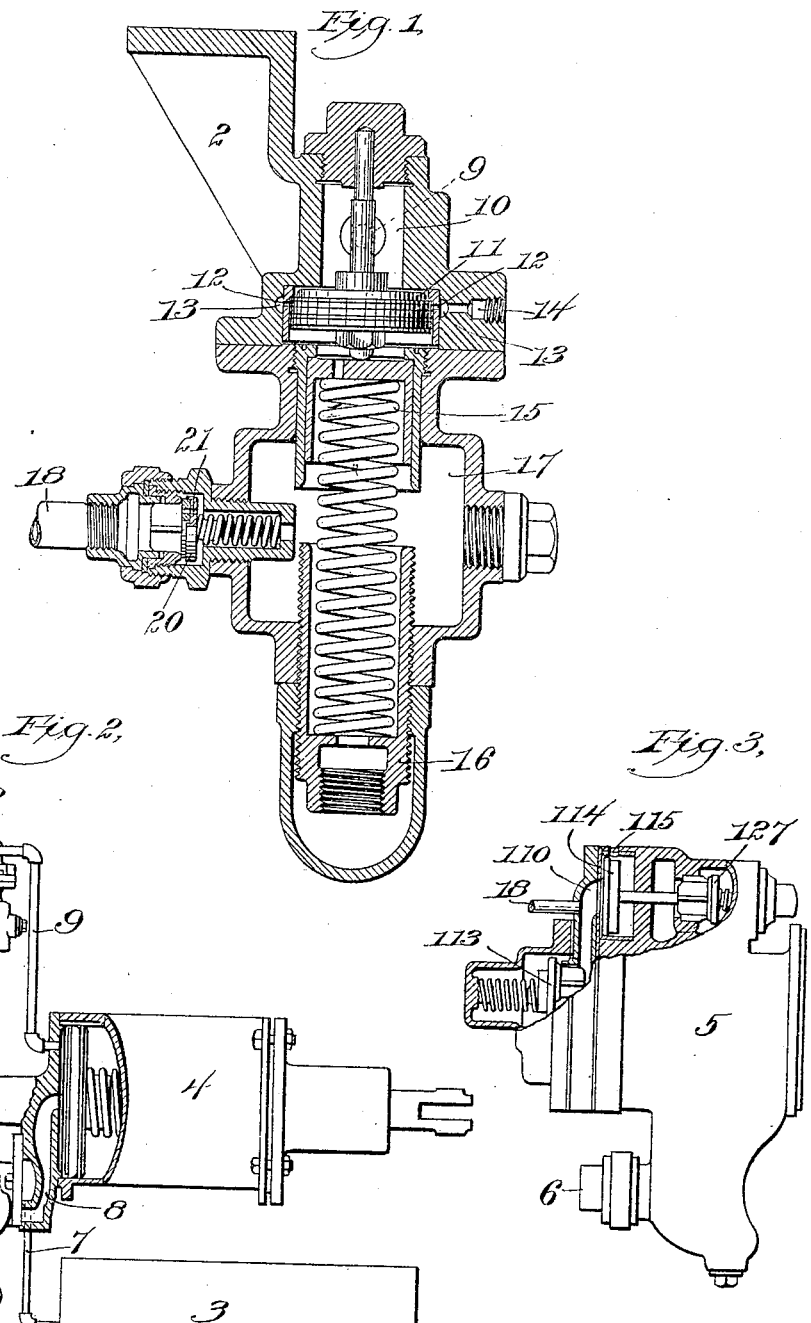
Witnesses:
Jas J Maloney
Margaret E Clooney
Inventor:
John P. Kelly,
by J. P. and H. Livermore
Attys

UNITED STATES PATENT OFFICE.

JOHN P. KELLY, OF WATERTOWN, NEW YORK, ASSIGNOR TO NEW YORK AIR BRAKE COMPANY, A CORPORATION OF NEW YORK.

AIR-BRAKE.

No. 823,048.            Specification of Letters Patent.          Patented June 12, 1906.

Application filed February 12, 1904. Serial No. 193,279.

*To all whom it may concern:*

Be it known that I, JOHN P. KELLY, a citizen of the United States, residing in Watertown, county of Jefferson, and State of New York, have invented an Improvement in Air-Brakes, of which the following description, in connection with the accompanying drawings, is a specification, like numerals on the drawings representing like parts.

This invention relates to air-brake apparatus and is shown as employed in an apparatus of the kind commonly known as the "automatic" air-brake, in which the brake-cylinder is charged with air from an auxiliary reservoir on the car under control of a triple valve coöperating with the train-pipe, auxiliary reservoir, and brake-cylinder to cause the brakes to be applied and released in response to changes in pressure of air in the train-pipe, which may be controlled by the engineer.

The present invention relates especially to an appliance for controlling the pressure in the brake-cylinder of the kind forming the subject of a prior patent, No. 761,683, dated June 7, 1904, said appliance being characterized by a relief-valve which normally prevents brake-cylinder pressure from exceeding a predetermined amount, but is combined with means for delaying the opening of the relief-valve under certain conditions that such an abnormally-high pressure may be retained in the brake-cylinder for a determinable interval of time, after which the relief-valve is opened to cause the pressure to be reduced to the normal maximum.

The present invention consists mainly in a novel construction and arrangement of the means for modifying and delaying the operation of the relief-valve under the desired conditions—viz., when an emergency as distinguished from a graduated or service application of the brakes has been made Figure 1 is a longitudinal section of an air-brake appliance forming the subject of this invention, the parts being shown in the normal position occupied when the brakes are released. Fig. 2 is a diagram view showing the main components of a car equipment of an automatic air-brake apparatus provided with means for controlling the brake-cylinder pressure in accordance with this invention, and Fig. 3 is a sectional detail of a portion of the triple valve, illustrating a portion of the means which may be employed for delaying the operation of the relief-valve.

The appliance forming the subject of this invention, which will be called a "brake-cylinder relief-valve," is shown at 2 in Fig. 2 in connection with the usual car equipment of what is commonly known as the "quick-action automatic air-brake system," said car equipment comprising also the auxiliary reservoir 3, brake-cylinder 4, and quick-action triple valve 5, which latter is connected with the train-pipe 6 and controls the various communications that are called into action in the handling of the brakes—namely, an exhaust-passage from the brake-cylinder to the atmosphere, which is opened for releasing the brakes and is closed preparatory to applying the brakes, and a communication 7 8 from the auxiliary reservoir 3 to the brake-cylinder 4, which is opened and closed in making graduated applications of the brakes, and a communication (not shown) from the train-pipe 6 to the auxiliary reservoir 3, which is opened when the brakes are released for recharging the auxiliary reservoir up to the pressure normally carried in the train-pipe.

The details of the car equipment are not fully shown, as they may be of any usual construction, and such apparatus is in extensive use and well known to those familiar with this art. The triple valve (shown in this instance in Fig. 3) is of the kind forming the subject of patent to A. P. Massey, No. 537,057, dated April 9, 1895, and now familiarly known as the "New York triple valve."

For a proper understanding of the relief-valve 2, forming the subject of this invention, it is sufficient to state that normally when the train is running with the brakes released the pressure in the auxiliary reservoirs 3 throughout the train is substantially equal to that maintained in the train-pipe 6, and that upon a reduction in train-pipe pressure the exhaust from the brake-cylinder to the atmosphere is closed and communication from the auxiliary reservoir to the brake-cylinder established until the flow of air from the auxiliary reservoir into the brake-cylinder reduces the pressure in the former to that established by the engineer in the train-pipe, after which the communication from the auxiliary reservoir to the brake-cylinder is closed with the pressure in the auxiliary reservoir again substantially equal to that in the train-pipe, which condition is maintained until a further increase of braking force is required, which is accomplished by permitting pressure to escape from the train-pipe and causing the communication from the auxiliary reservoir to the brake-cylinder to be again opened and then again closed when the auxiliary-reservoir pressure has equalized with the newly-established lower pressure in the train-pipe. A moderate reduction in train-pipe pressure thus permits a relatively small amount of air to flow from the auxiliary reservoir into the brake-cylinder and applies the brakes with moderate pressure, and the braking pressure may be increased in response to further diminutions in train-pipe pressure until the increasing brake-cylinder pressure equalizes with the falling auxiliary-reservoir pressure, at which time the maximum braking force is attained and further reduction in the train-pipe pressure produces no change in the condition of the brake apparatus. A sudden reduction in train-pipe pressure to or below the said pressure of equalization of the auxiliary-reservoir and brake-cylinder air, or maximum braking pressure, causes the communication between the auxiliary reservoir and brake-cylinder to be fully opened, so that the full pressure of equalization is very quickly attained in the brake-cylinder in response to such reduction in train-pipe pressure, which is made by the engineer in case of emergency or is made in the event of the breaking of the train-pipe in any way, as by the parting of a coupling.

In the New York triple valve, as illustrated in Fig. 3, the movement of the triple-valve piston in response to a sudden reduction in train-pipe pressure, such as takes place in making an emergency application, causes the valve 113 to be opened, and thus to place the train-pipe in communication with a passage 110 115 to the atmosphere, through which the train-pipe is locally vented, and thereby further reduces train-pipe pressure, and thus hastens the operation of the series of triple valves throughout the train. The train-pipe air, although its pressure has been considerably reduced in causing the emergency operation of the triple valve which opens the train-pipe vent-valve 113, is still at high pressure when the said vent-valve is opened, and thus acts with considerable pressure in the escape-passage 110 on a piston 114, which thereby is caused to open a valve 127, which admits air from the auxiliary reservoir to the brake-cylinder with greater promptness than in the normal or service operation of the apparatus in which the train-pipe vent-valve 113 is not opened and none of the appliances just described as actuated by escaping train-pipe air are called into operation.

For convenience of referring to concrete conditions it may be assumed that a pressure of one hundred and ten pounds is normally carried in the system (in the train-pipe and auxiliary reservoirs) and that this would give a braking pressure of eighty-five pounds in the brake-cylinder as the pressure of equalization in the brake-cylinder and auxiliary reservoir when communication is made and maintained between the two, as in making an emergency application of the brakes with no discharge-passage or relief opening from the brake-cylinder. It may be assumed, furthermore, that sixty pounds pressure in the brake-cylinder is the normal maximum, which is all that should be exerted in the brake-cylinder in making the usual service stops, or even in emergency stops, after the speed of the train has become materially reduced, as a greater braking pressure applied when the train is moving relatively slowly will be liable to lock the wheels and cause them to slide on the track, which, as is well known, is highly objectionable. With the brake apparatus proportioned and charged as just assumed, it is possible to obtain as a maximum eighty-five pounds pressure in the brake-cylinder, and if the apparatus comprised only the usual equipment this could be produced in service applications of the brakes by the successive increases in brake-cylinder pressure, or by a relatively slow continuous flow of air from the auxiliary reservoir to the brake-cylinder, such as is produced in making a full-service application of the brakes, in which the engineer causes the train-pipe pressure to be continuously reduced, but at a comparatively slow rate.

The appliance forming the subject of this invention is for the purpose of preventing brake-cylinder pressure being increased substantially beyond the desired predetermined maximum—assumed to be sixty pounds in the brake-cylinder in service applications—but to permit of its being applied to the full pressure attainable in an emergency application and retained at such abnormal pressure (here assumed as eighty-five pounds) for a certain period of time, after which it is reduced to the normal maximum of sixty pounds. The relief-valve 2, which contains instrumentalities for accomplishing these results, is connected by a duct or passage 9 with the brake-cylinder 4, said passage 9 opening into a chamber 10 in said relief-valve. The brake-cylinder pressure, whatever it may be, is therefore present at all times in said chamber 10 and acts upon a piston or movable abutment 11, which in this instance also constitutes the relief-valve proper, said abutment controlling one or more passages 12 in the cylinder in which it works, which passages are opened or uncovered when said piston 11 is moved away from the chamber 10 by the brake-cylinder pressure exerted therein, so that air may then pass from said chamber 10, through said passages 12, into the annular space 13 around the cylinder-lining, and thence through an opening or escape-passage 14 to the atmosphere. The brake-cylinder pressure in the chamber 10 acting upon the piston 11 is opposed by a predetermined force, such as that of a spring 15, the force or pressure of which may be adjusted by the spring-support 16 and is set to balance the air-pressure in the chamber 10 at the normal maximum desired to be carried in the brake-cylinder—for example, sixty pounds—so that as soon as the brake-cylinder pressure rises above sixty pounds it is sufficient to overcome the force of the spring 15, and if no other agency is called into action will then move the piston 11 to open the passages 12, and permit air to escape from the chamber 10 and brake-cylinder until its pressure is no longer sufficient to overcome spring 15, which will then move back the piston 11, so as to close the passages 12 and prevent further escape of air from the brake-cylinder through the relief-valve. The appliances thus far described, therefore, operate like an ordinary relief-valve or safety-valve to prevent substantial increase of pressure in the brake-cylinder beyond that which is sufficient to overcome the spring 15 acting on the relief-valve and cause the same to be opened.

In order to prevent the relief-valve from opening when an excess of pressure is desired to be produced and maintained for a certain period of time in the brake-cylinder, as in the case of an emergency application of the brakes, means are provided for augmenting or supplementing the force of the spring 15 in opposition to the brake-cylinder pressure in the chamber 10 acting on the piston 11. This supplemental force is derived from fluid-pressure in a fluid-pressure chamber 17 (shown in this instance as on the opposite side of the piston 11 from the chamber 10) and also inclosing the spring 15, fluid-pressure in the chamber 17 thus acting upon the movable abutment 11 in opposition to the pressure in the chamber 10.

Inasmuch as the abutment 11 should normally respond to a pressure in the chamber 10 sufficient to overcome the force of the spring 15 the fluid-pressure should normally be absent from the pressure-chamber 17; but provision is made for admitting fluid at sufficient pressure to said chamber under those conditions in which it is desired that a greater than normal or usual pressure should be obtained in the brake-cylinder. As means for supplying the fluid-pressure in the chamber 17 in an emergency application of the brakes when it is desired to obtain a greater than normal or usual pressure in the brake-cylinder the said pressure-chamber 17 is connected by a pipe or duct 18 with the train-pipe air-discharge passage 110, (see Fig. 3,) which receives air from the train-pipe only when the vent-valve 113 is opened, which is only in an emergency application of the brake. Thus when the train-pipe air is escaping through the passages 110 115 to the atmosphere a portion thereof flows through the pipe 18 into the chamber 17 and charges the latter up to the desired pressure, which under the conditions hereinbefore assumed may be about forty-five or fifty pounds to the square inch. This pressure acts upon the movable abutment 11 to counterbalance an equal amount of brake-cylinder pressure exerted in the chamber 10 on the opposite side of the piston 11, or, in other words, the pressure in the chamber 17 will be added to the force of the spring 15 to resist the opening of the brake-cylinder relief-passages 12 by the movement of the piston 11 in response to brake-cylinder pressure. If, therefore, the spring 15 can withstand the pressure of sixty pounds and the pressure in the chamber 17 is forty-five pounds the total force on the abutment 11 to be overcome by brake-cylinder pressure is equivalent to one hundred and five pounds to the square inch, and consequently would cause any brake-cylinder pressure less than one hundred and five pounds to be retained in the brake-cylinder without relief as long as those conditions prevailed. The maximum brake-cylinder pressure under such conditions, however, is, as already stated, only about eighty-five pounds, and therefore that pressure will be maintained as long as the fluid-pressure in the chamber 17 is twenty-five pounds or more.

In order to provide for the retention of the desired fluid-pressure in the chamber 17 for a determinate period of time and for the sufficient reduction of said pressure to cause the brake-cylinder pressure to open the relief-valve and reduce the pressure on the brake-cylinder after such lapse of time, the connecting-passage 18 from the triple valve to the pressure-chamber 17 is provided with a check-valve 20, which opens toward the chamber 17 and is provided with a small passage 21 through or past it, which remains constantly open. Thus in response to the sudden access of air in the train-pipe discharge-passage 110 the check-valve 20 is opened and the chamber 17 promptly charged to the required pressure, after which the check-valve 20 seats and confines the said pressure in said chamber, except as it may escape slowly through the passage 21 to the pipe 18, which is open to the atmosphere at the train-pipe discharge-outlet 115 of the triple valve.

The passage 21 is proportioned to the capacity of the chamber 17 to permit pressure in the latter to fall at any required rate, and if, for example, it falls at the rate of five pounds a second and is originally forty-five pounds it will require four seconds for the pressure to fall to twenty-five pounds in the chamber 17, during which time the brake-cylinder pressure, although at eighty-five pounds or twenty-five pounds above normal, would be insufficient to open the relief-valve. Thereafter in the further fall of pressure in the chamber 17 the said pressure, in addition to the force of the spring 15, will be insufficient to overcome the abnormal pressure in the brake-cylinder, which will then open the relief-valve or discharge-passages 12 and diminish the brake-cylinder pressure to the point at which it is no longer sufficient to overcome the spring 15 unaided, (the pressure having now entirely escaped from the chamber 17,) when the said spring will close the relief-valve and retain the brake-cylinder pressure at its normal amount without further reduction until the brakes are released by the engineer.

In service applications of the brakes the train-pipe vent-valve 113 is not opened, and therefore no fluid-pressure is supplied in the chamber 17, and the relief-valve operates in response to the brake-cylinder pressure and the pressure of the spring 15 to prevent the brake-cylinder pressure from exceeding the amount for which the spring is set, as already explained.

It is immaterial what source the fluid-pressure employed in the chamber 17 may be taken from, it being necessary only that the fluid-pressure should be supplied to said chamber only in an emergency application of the brakes or under the conditions in which it is desired that a greater than normal or usual pressure should be retained in the brake-cylinder for a desired interval of time. The specific construction of the means for retaining the pressure in the chamber 17 and for discharging said pressure therefrom after a desired lapse of time is also immaterial and obviously may be varied without substantial departure from the essential characteristics or features of the construction and operation of the relief-valve.

What I claim is—

1. The combination of the train-pipe, auxiliary reservoir, brake-cylinder and triple valve of an automatic air-brake apparatus, said triple valve having an escape-passage from the train-pipe, and means for opening the same in an emergency application of the brakes with a brake-cylinder relief-valve and a movable abutment or actuator therefor, and fluid-pressure chambers on opposite sides of said abutment, one of which communicates with the brake-cylinder, and the other of which pressure-chambers communicates with the escape-passage from the train-pipe of the triple valve, substantially as and for the purpose described.

2. A relief-valve for the brake-cylinder of a fluid-pressure-brake system, comprising a discharge-passage, and valve controlling the same, a movable abutment controlling said discharge-valve, and exposed at one side to the fluid-pressure in the brake-cylinder to be relieved, and at the other side to a determinate opposing force, a fluid-pressure chamber, the pressure in which acts in opposition to brake-cylinder pressure on the movable abutment, and means responsive to an emergency application of the brakes for admitting fluid-pressure to the latter chamber, and for permitting said pressure to escape at a predetermined rate, substantially as and for the purpose described.

3. The combination of a brake-cylinder discharge-valve, a movable abutment controlling the operation of the same, pressure-chambers at opposite sides of said movable abutment, one communicating with the brake-cylinder, a spring acting on said movable abutment in opposition to brake-cylinder pressure, and a supply-passage to the pressure-chamber on the side of the movable abutment opposite that communicating with the brake-cylinder, said supply-passage being provided with an inwardly-opening check-valve and a relatively small open passage past said check-valve, substantially as and for the purpose described.

4. In a fluid-pressure brake, the combination with a movable abutment operated by brake-cylinder pressure for controlling a brake-cylinder outlet, of means operated by a sudden reduction in train-pipe pressure in emergency applications for supplying fluid-pressure to oppose the action of the brake-cylinder pressure on said abutment.

5. In a fluid-pressure brake, the combination with a movable abutment or valve subject to the opposing pressures of the brake-cylinder and a spring for controlling a brake-cylinder discharge-port, of a valve device operated by a sudden reduction in train-pipe pressure in emergency applications for supplying fluid-pressure to assist the spring in holding the discharge-port closed.

6. In a fluid-pressure brake, the combination with a movable abutment or valve for controlling a brake-cylinder discharge-port and adapted to be opened by the brake-cylinder pressure, of an air-chamber, a valve device operated by a sudden reduction in train-pipe pressure in emergency applications for supplying air under pressure to said chamber for holding the brake-cylinder discharge-port closed, and means for permitting a slow and gradual reduction of pressure in said air-chamber.

7. In a fluid-pressure brake, the combination with a movable abutment subject on one side to brake-cylinder pressure for controlling a brake-cylinder discharge-port, of a valve device operated by a sudden reduction in train-pipe pressure in emergency applications for supplying air to a chamber for opposing the action of the brake-cylinder pressure on said abutment, and an outlet from said chamber.

In testimony whereof I have signed my name to this specification in the presence of two subscribing witnesses.

JOHN P. KELLY.

Witnesses:
   JNO. F. MALONEY,
   W. F. NICOL.